(12) United States Patent
Park et al.

(10) Patent No.: US 8,149,352 B2
(45) Date of Patent: Apr. 3, 2012

(54) BACKLIGHT UNIT AND LIQUID CRYSTAL DISPLAY DEVICE HAVING THE SAME

(75) Inventors: Ki Duck Park, Paju-si (KR); Hyun Woo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 170 days.

(21) Appl. No.: 12/606,856

(22) Filed: Oct. 27, 2009

(65) Prior Publication Data

US 2010/0103340 A1    Apr. 29, 2010

(30) Foreign Application Priority Data

Oct. 28, 2008    (KR) .................. 10-2008-0106191

(51) Int. Cl.
*G02F 1/13357*    (2006.01)
*F21V 7/00*    (2006.01)
*G09F 13/08*    (2006.01)

(52) U.S. Cl. ............................ 349/68; 349/58; 362/97.2

(58) Field of Classification Search ............ 349/58, 349/61, 68; 362/97.1, 97.2, 631, 633, 634, 362/217.09, 97.3

See application file for complete search history.

(56) References Cited

U.S. PATENT DOCUMENTS

| 7,534,023 | B2 * | 5/2009 | Ahn et al. ...................... 362/561 |
| 2003/0197116 | A1 * | 10/2003 | Downs .......................... 250/229 |
| 2007/0002474 | A1 * | 1/2007 | Amemiya et al. ............ 359/857 |
| 2007/0291512 | A1 | 12/2007 | Lee et al. |
| 2008/0231775 | A1 | 9/2008 | Lee |

* cited by examiner

*Primary Examiner* — David Nelms
*Assistant Examiner* — Tai Duong
(74) *Attorney, Agent, or Firm* — Birch, Stewart, Kolasch & Birch, LLP

(57) ABSTRACT

A backlight unit which prevents an initial driving malfunction is disclosed. The backlight unit includes: a bottom cover opened upwardly; a reflective sheet disposed in the inner surface of the bottom cover; a plurality of lamps arranged in a fixed interval on the reflective sheet; a driver disposed on the rear surface of the bottom cover; an auxiliary light source loaded on the driver; a first hole formed in a region of the bottom cover opposite to the auxiliary light source; and a hole region, on the reflective sheet, including one of plural micropenetration holes and plural slit holes and opposite the first hole on the reflective sheet.

10 Claims, 4 Drawing Sheets

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2008-0106191, filed on Oct. 28, 2008, which is hereby incorporated by reference in its entirety.

BACKGROUND

1. Field of the Disclosure

This disclosure relates to a backlight unit, and more particularly to a backlight unit which prevents an initial driving malfunction, and a liquid crystal display device having the same.

2. Description of the Related Art

Display devices used for computer monitors or TVs include self-light-emitting devices such as organic light emitting displays (OLEDs), vacuum fluorescent displays (VFDs), field emission displays (FEDs), and plasma display panels (PDPs), as well as non self-light emitting devices such as liquid crystal displays (LCDs). A general LCD device includes two substrates having electric field generation electrodes and a liquid crystal layer having dielectric anisotropy and interposed between the substrates. When a certain voltage is applied to the electric field generation electrodes, an electric field is generated in the liquid crystal layer. The strength of the electric field is adjusted by changing the voltage. Thus, a desired image is displayed by controlling the transmissivity of light passing through the liquid crystal layer.

The LCD device includes a data driver, a gate driver, and a backlight unit. The data driver externally receives image data, generates the data signal of a specific pixel and supplies the generated data signal to a data line of an LCD panel The gate driver generates a gate signal to drive the pixels of the LCD panel by one line and supplies the generated gate signal to a gate line of the LCD panel The backlight unit is disposed on the rear surface of the LCD panel and provides light.

Cold cathode fluorescent lamps (CCFLs), external electrode fluorescent lamps (EEFLs), or light emitting diodes (LEDs) are used as the light source of a general backlight unit. Recently, the EEFLs are widely used as the light source of a backlight unit due to their merits such as a long lifespan.

If the EEFL included in the direct type backlight unit of the large LCD device is left in the darkness or at a low temperature, gas injected into the EEFL changes into a basic state. As such, the EEFL does not light up when the LCD device is initially driven. In other words, an initial driving malfunction occurs in the EEFL and the backlight unit having the same.

BRIEF SUMMARY

Accordingly, the present embodiments are directed to a backlight unit that substantially obviates one or more of problems due to the limitations and disadvantages of the related art.

An object of the present embodiment is to provide a backlight unit which prevents an initial driving malfunction, and an LCD device having the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit comprising: a bottom cover opened upwardly; a reflective sheet disposed in the inner surface of the bottom cover; a plurality of lamps arranged in a fixed interval on the reflective sheet; a driver disposed on the rear surface of the bottom cover; an auxiliary light source loaded on the driver; a first hole formed in a region of the bottom cover opposite to the auxiliary light source; and a hole region, on the reflective sheet, including one of plural micro-penetration holes and plural slit holes and opposite the first hole on the reflective sheet.

An LCD device according to one general aspect of the present embodiment comprising: an LCD panel; a bottom cover disposed on the rear surface of the LCD panel; a reflective sheet disposed in the inner surface of the bottom cover; a plurality of lamps arranged in a fixed interval on the reflective sheet; a driver disposed on the rear surface of the bottom cover; an auxiliary light source loaded on the driver; a first hole formed in a region of the bottom cover opposite to the auxiliary light source; and a hole region, on the reflective sheet, including one of plural micro-penetration holes and plural slit holes and opposite the first hole on the reflective sheet.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
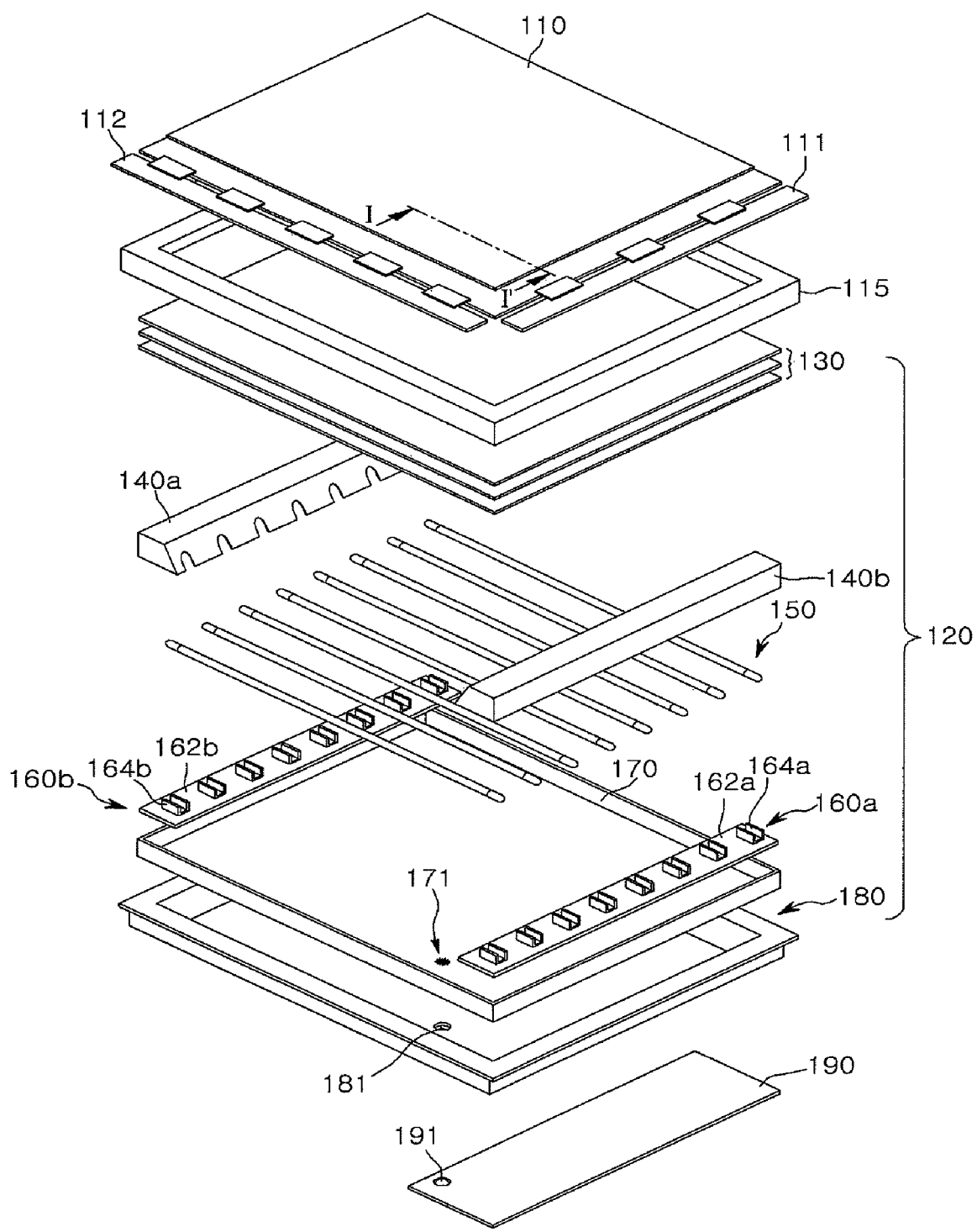
FIG. 1 is an exploded perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
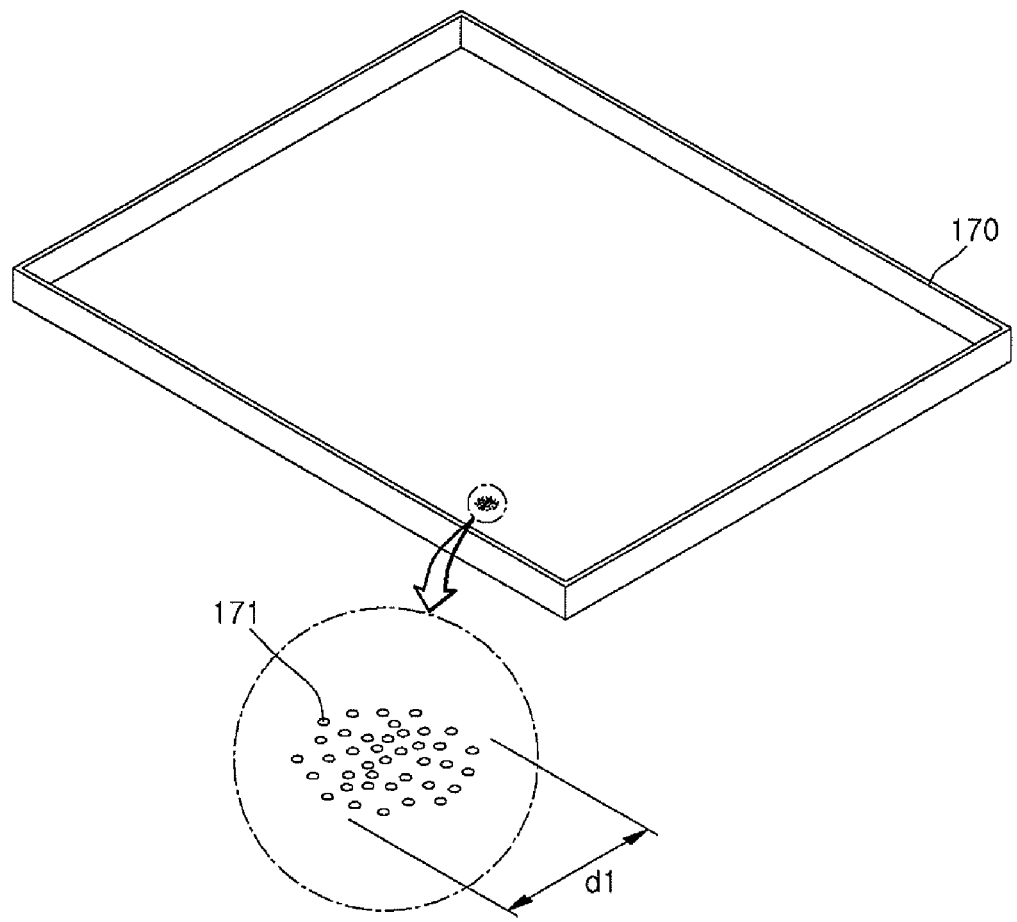
FIG. 2 is a perspective view of the reflective sheet shown in FIG. 1.
Figure 3:
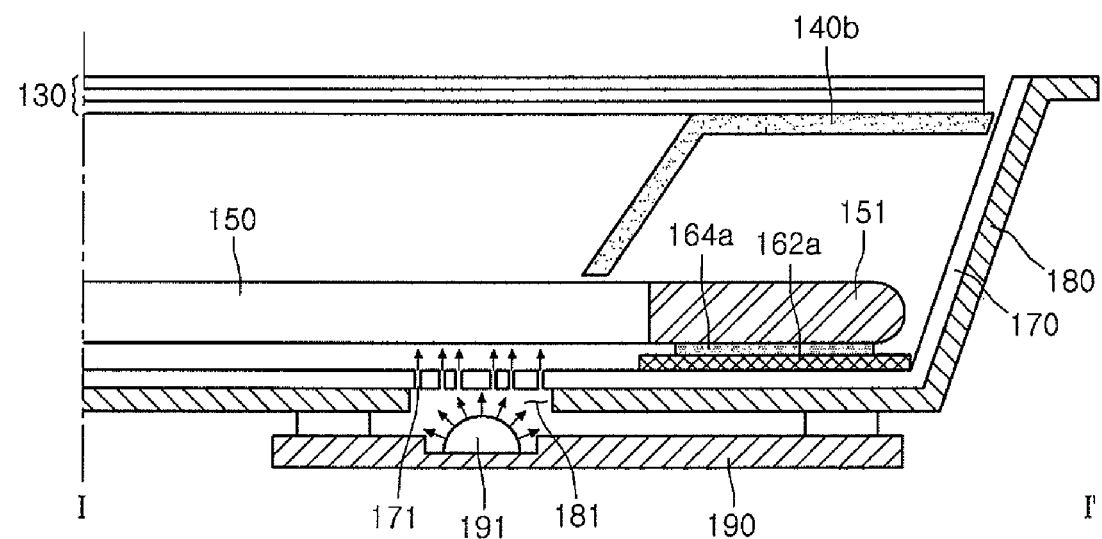
FIG. 3 is a cross-sectional view of the backlight unit taken along the line I-I' shown in FIG. 1.

FIG. 1 is an exploded perspective view showing an LCD device according to an embodiment of the present disclosure. FIG. 2 is a perspective view of the reflective sheet shown in FIG. 1. FIG. 3 is a cross-sectional view of the backlight unit taken along the line I-I' shown in FIG. 1. Referring to FIGS. 1 to 3, an LCD device according to the present embodiment includes an LCD panel 110 for displaying an image and a backlight unit 120 arranged on the rear surface of the LCD panel 110 and providing light to the LCD panel 110.

Although it is not shown in detail in the drawings, the LCD panel 110 includes a thin film transistor (TFT) array substrate and a color filter substrate which are combined together to face each other and maintain a uniform cell gap therebetween, as well as a liquid crystal layer interposed between the TFT array substrate and the color filter substrate. The TFT array substrate is defined into pixel regions by a plurality of gate and data lines crossing each other and includes a TFT formed at each intersection of the gate and data lines. The color filter substrate includes a color filter formed in each pixel region, and a black matrix formed opposite the gate and data lines and the TFTs on the edges of the color filters.

A gate driver 111 is provided on an edge of the LCD panel 110 and a data driver 112 is provided on another edge of the LCD device 110. The gate driver 111 applies a scan signal to the gate line every one horizontal synchronous period so that the TFTs connected to the gate line to which the scan signal is applied are turned on/off. The data driver 112 applies data signals to the data lines. In this case, the gate driver 111 and the data driver 112 are loaded on printed circuit boards (PCBs) and are electrically connected to the LCD panel 110 by means of tape carrier packages (TCPs), respectively.

A panel guide 115 supporting the LCD panel 100 is disposed on the edge of the rear surface of the LCD panel 100. The panel guide 115 is combined with the backlight unit 120.

The backlight unit 120 that provides light to the LCD device 100 includes: a bottom cover 180 opened upward, a reflective sheet 170 disposed on the inner surface of the bottom cover 180, a plurality of lamps 150 arranged on the reflective sheet 170, and optical sheets 130 disposed over the plural lamps 150 and diffusing and converging light.

The backlight unit 120 includes first and second common electrode portions 160a and 160b disposed at both ends of the plural lamps 150, and first and second support sides 140a and 140b disposed at both ends of the plural lamps 150. The first and second common electrode portions 160a and 160b apply a drive signal to the plural lamps 150. To this end, the first common electrode portion 160a includes a first drive PCB 162a, as well as first electrodes 164a arranged on the first drive PCB 162a and connected to one end of the plural lamps 150. Similarly, the second common electrode portion 160b also includes a second drive PCB 162b, and second electrodes 164b arranged on the second drive PCB 162b and connected to the other end of the plural lamps 150. The first and second support sides 140a and 140b guide light emitted from the lamps 150 to the edge areas of the LCD panel 110 and support the optical sheets 130. The lamps 150 may be CCFLs or EEFLs.

A system drive PCB 190 loaded with a controller (not shown) driving the LCD panel 110 is disposed on the rear surface of the bottom cover 180 of the backlight unit 120. The system drive PCB 190 further includes an auxiliary light source 191. The auxiliary light source 191 prevents the initial driving malfunction of the plural lamps 150 which can occur when the lamps 150 are left in darkness or at a low temperature. For the auxiliary light source 191, a light emission diode (LED) can be employed. Although the auxiliary light source 191 is described as having been disposed in the system drive PCB 190, the LCD device of present embodiment is not limited to this. For example, the auxiliary light source 191 can be included in the backlight drive PCB (not shown) loaded with an inverter (not shown) driving the lamps 150.

In the bottom cover 180, a circular penetration hole 181 (or a circular through hole 181) is formed opposite the auxiliary light source 191. It is preferable for the circular penetration hole 181 to have an area wider than that of the auxiliary light source 191.

A plurality of micro-penetration holes 171 are formed in the region of the reflective sheet 170 opposite to the a circular penetration hole 181 of the bottom cover 180. The micro-penetration holes 171 allow a portion of the light emitted from the auxiliary light source 191 to irradiate the opposite lamps 150. Accordingly, the micro-penetration holes 171 can prevent the initial driving malfunction of the lamps 150 in darkness or at a low temperature. It is preferable for the region including the micro-penetration holes 171 to have a width d1 narrower than the diameter of the glass tube of the lamps 150.

If light emitted from the auxiliary light source 191 is directly irradiated toward the lamp 150 when displaying an image, the brightness of the region in which the auxiliary light source 191 is positioned becomes larger than that of other regions. In other words, a brightness of the displayed image becomes non-uniform due to the light emitted from the auxiliary light source 191. On the contrary, the micro-penetration holes 171 according to the present embodiment partially guide light emitted from the auxiliary light source 191 toward the lamps 150. Accordingly, the uniformity of the brightness is improved.

In this manner, the LCD device according to the embodiment of the present disclosure includes the auxiliary light source 191 disposed in the system drive PCB 190 on the rear surface of the bottom cover 180, the circular penetration hole 181 formed in the region of the bottom cover 181 opposite to the auxiliary light source 181, and the micro-penetration holes 191 formed in the region of the reflective sheet 180 opposite to the circular penetration hole 191. As such, light emitted from the auxiliary light source 191 is partially irradiated to the opposite lamp 150, so that the lamps 150 start to accurately drive in darkness or at a low temperature.

Furthermore, as the initial lighting malfunction of the lamps 150, which occurs when left during a long time in darkness and at a low temperature, is prevented, the LCD device of another embodiment of the present disclosure can improve the display quality at the initial driving.

Figure 4:
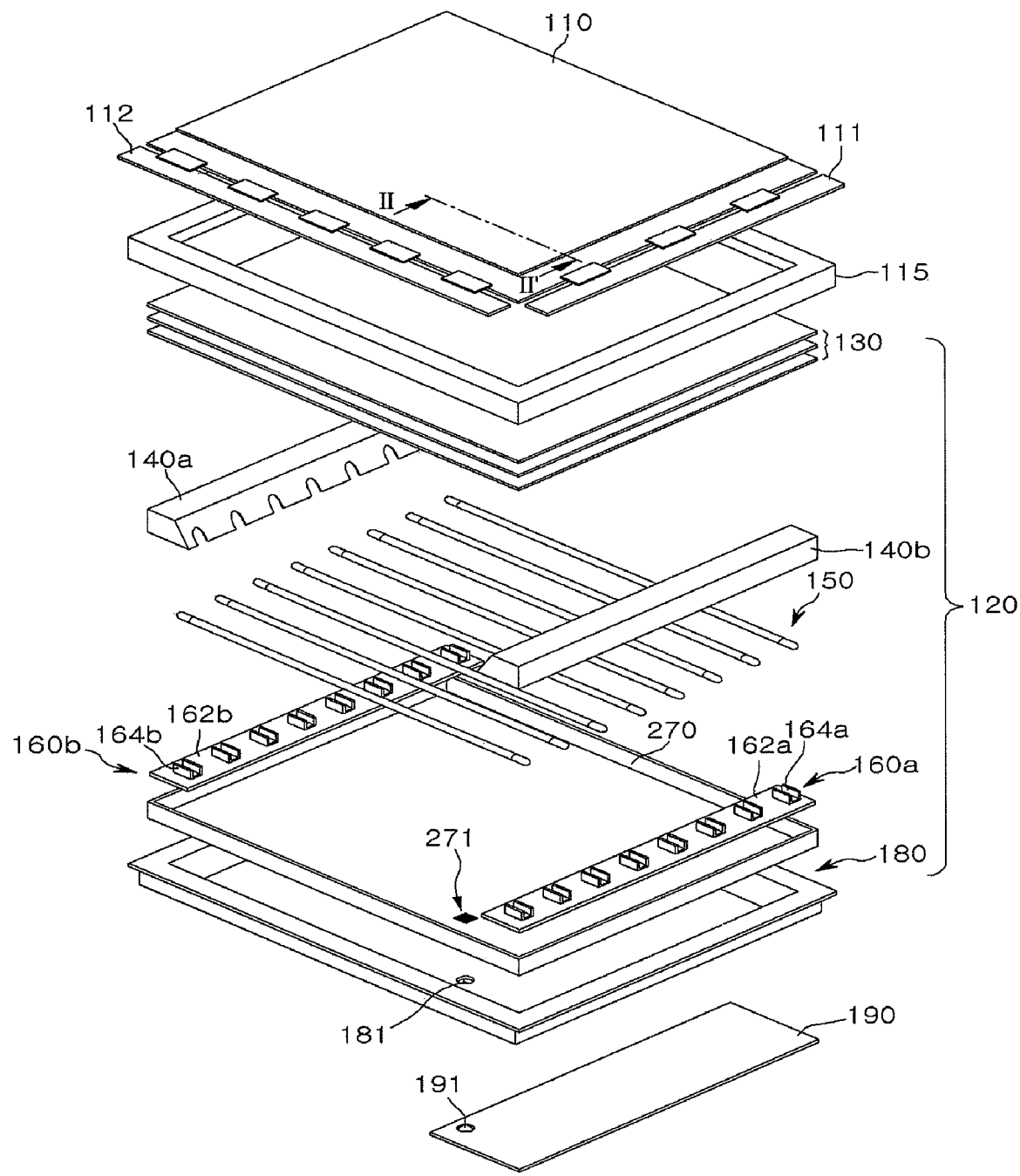
FIG. 4 is an exploded perspective view showing an LCD device according to another embodiment of the present disclosure.
Figure 5:
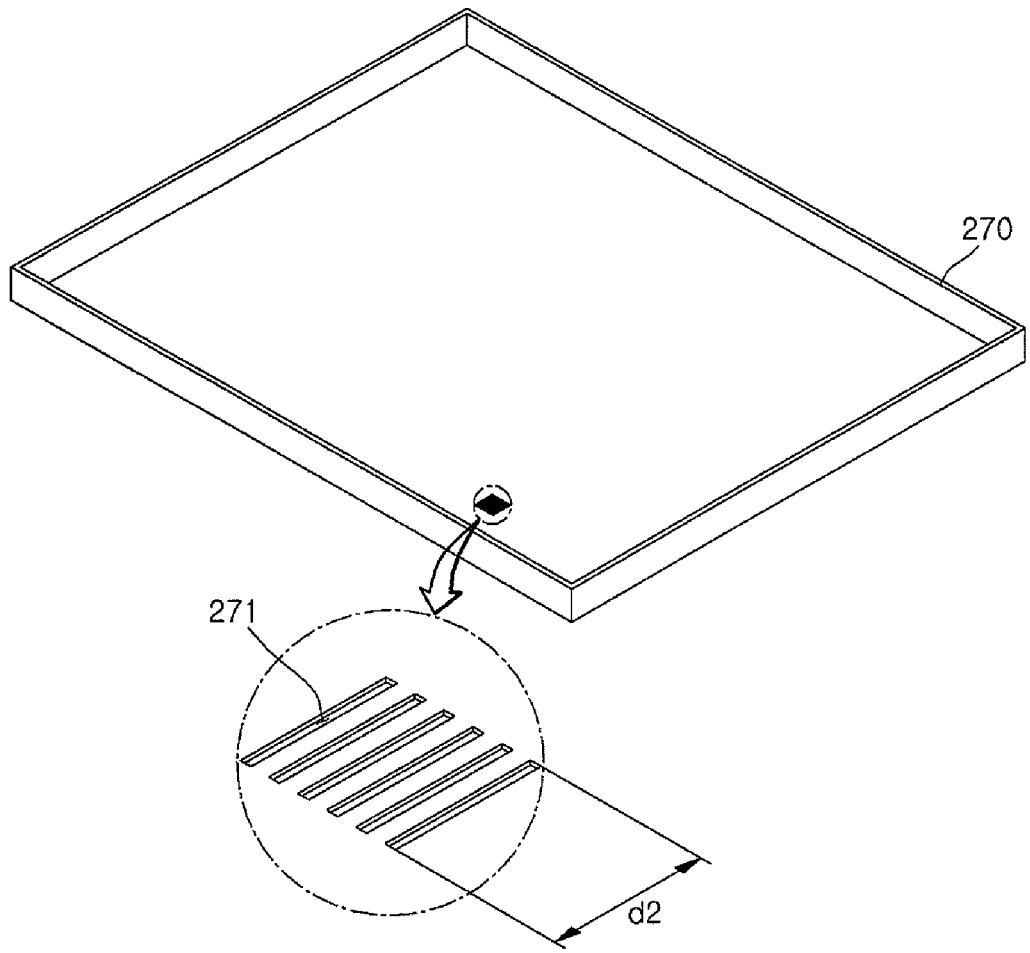
FIG. 5 is a perspective view of the reflective sheet shown in FIG. 4.
Figure 6:
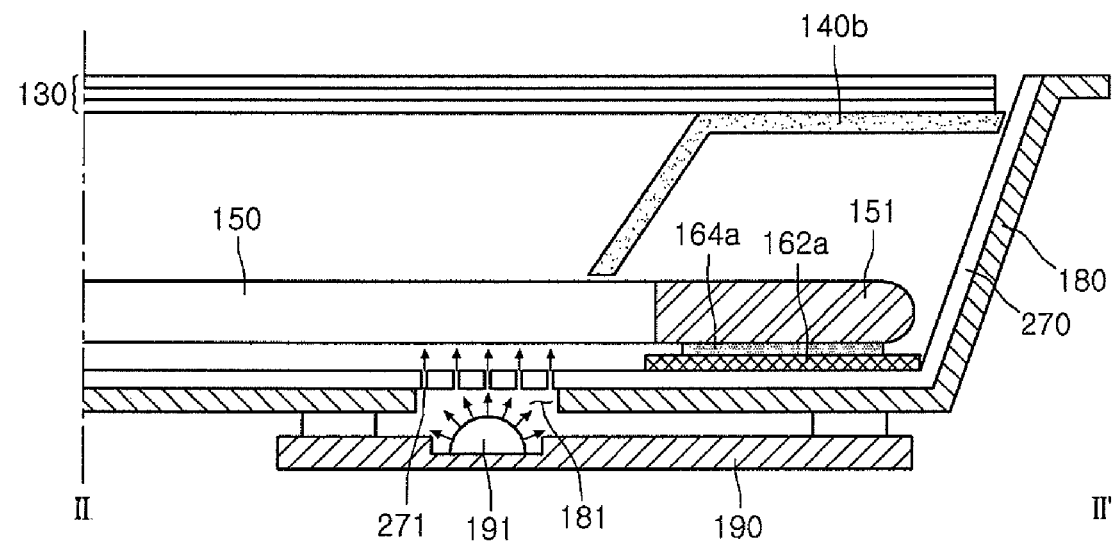
FIG. 6 is a cross-sectional view of the backlight unit taken along the line II-II' shown in FIG. 4.

FIG. 4 is an exploded perspective view showing an LCD device according to another embodiment of the present disclosure, FIG. 5 is a perspective view of the reflective sheet shown in FIG. 4, and FIG. 6 is a cross-sectional view of the backlight unit taken along the line II-II' shown in FIG. 4.

The LCD device according to another embodiment the present disclosure shown in FIGS. 4 to 6 has the same structure as that of the first embodiment shown in FIGS. 1 to 3, with the exception of a reflective sheet 270. Accordingly, the description of the first embodiment to be repeated in the second embodiment of the present disclosure will be omitted. Also, the LCD device according to another embodiment of the present disclosure will refer to the same reference numbers for the same elements as that according to the first embodiment.

A plurality of slit holes 271 are formed in the region of the reflective sheet 270 opposite to the a circular penetration hole 181 of the bottom cover 180. The slit holes 271 allow a portion of the light emitted from the auxiliary light source 191 to irradiate to the opposite lamp 150. Accordingly, the slit holes 271 can prevent the initial driving malfunction of the lamps 150 in darkness or at a low temperature. It is preferable for the slit holes 271 to have a length d2 shorter than the diameter of the glass tube of the lamp 150.

In addition, since the slit holes 271 partially guide light emitted from the auxiliary light source 191 toward the lamps 150, the backlight unit 120 improves the uniformity of the brightness (i.e., prevent a phenomenon whereby the brightness of a region at which the auxiliary light source 191 is positioned becomes greater than that of the other regions). Non-uniform brightness is otherwise caused by directly irradiating light from the auxiliary light source 191 to the lamps 150.

In this manner, the LCD device according to another embodiment includes: the auxiliary light source 191 disposed in the system drive PCB 190 on the rear surface of the bottom cover 180, the circular penetration hole 181 formed in the region of the bottom cover 181 opposite to the auxiliary light source 181, and the slit holes 271 formed in the region of the reflective sheet 180 opposite to the circular penetration hole 191. As such, light emitted from the auxiliary light source 191 is partially irradiated to the opposite lamp 150, so that the lamps 150 start to accurately drive in darkness at a low temperature.

Furthermore, since the initial lighting malfunction of the lamps 150, caused when left during a long time in darkness or at a low temperature, is prevented, the LCD device of another embodiment can improve the display quality at the initial driving.

As described above, the LCD devices according to the embodiments of the present disclosure allows light emitted from the auxiliary light source 191 to pass through the micro-penetration holes 171 or the slit holes 271 in only the quantity which is required by the lamps 150. Therefore, the lamps 150 start to drive easily when in darkness or at a low temperature. Also, these LCD devices can prevent the auxiliary light source from being viewed by a user upon the display of an image.

Also, two LCD devices have been described as the embodiments of the present disclosure, but the present disclosure is not limited these. Actually, various modifications and variations are made in the configuration whereby light emitted from the auxiliary light source 191 is directly irradiated to the lamps 150 through the micro-penetration holes 171 or the slit holes 271 formed in the region of the reflective sheet 170 or 270 opposite to the auxiliary light source 191. Thus, it is intended that the present disclosure cover the modifications and variations of these embodiments, provided they come within the scope of the appended claims and their equivalents.

What is claimed is:

1. A backlight unit comprising:
   a bottom cover opened upwardly;
   a reflective sheet disposed in an upper surface of the bottom cover;
   a plurality of lamps arranged in a fixed interval on the reflective sheet;
   a driver disposed on a rear surface of the bottom cover;
   an auxiliary light source loaded on a drive PCB; and
   a first hole formed in a region of the bottom cover opposite to the auxiliary light source,
   wherein the reflective sheet has a hole region including one of plural micro-penetration holes and plural slit holes and opposite the first hole, and
   wherein the hole region and one of the plurality lamps overlap each other.

2. The backlight unit claimed as claim 1, wherein the width of the hole region is narrower than the diameter of a glass tube of one of the plurality of lamps.

3. The backlight unit claimed as claim 1, wherein the length of the slit hole is shorter than the diameter of a glass tube of one of the plurality of lamps.

4. The backlight unit claimed as claim 1, wherein the first hole is formed in a circle shape and has an area larger than the size of the auxiliary light source.

5. The backlight unit claimed as claim 1, wherein the drive PCB includes any one of a backlight drive PCB and a system drive PCB driving an LCD panel.

6. An LCD device comprising:
   an LCD panel;
   a bottom cover disposed on a rear surface of the LCD panel;
   a reflective sheet disposed in an inner surface of the bottom cover;
   a plurality of lamps arranged in a fixed interval on the reflective sheet;
   a driver disposed on a rear surface of the bottom cover;
   an auxiliary light source loaded on a drive PCB; and
   a first hole formed in a region of the bottom cover opposite to the auxiliary light source,
   wherein the reflective sheet has a hole region including one of plural micro-penetration holes and plural slit holes and opposite the first hole, and
   wherein the hole region and one of the plurality lamps overlap each other.

7. The LCD device claimed as claim 6, wherein the width of the hole region is narrower than the diameter of a glass tube of one of the plurality of lamps.

8. The LCD device claimed as claim 6, wherein the length of the slit hole is shorter than the diameter of a glass tube of one of the plurality of lamps.

9. The LCD device claimed as claim 6, wherein the first hole is formed in a circle shape and has an area larger than the size of the auxiliary light source.

10. The LCD device claimed as claim 6, wherein the drive PCB includes any one of a backlight drive PCB and a system drive PCB driving the LCD panel.

* * * * *